No. 678,344. Patented July 9, 1901.
P. LUHR.
METHOD OF OPERATING ELECTRIC ARC LAMPS.
(Application filed Dec. 26, 1900.)
(No Model.) 4 Sheets—Sheet 1.
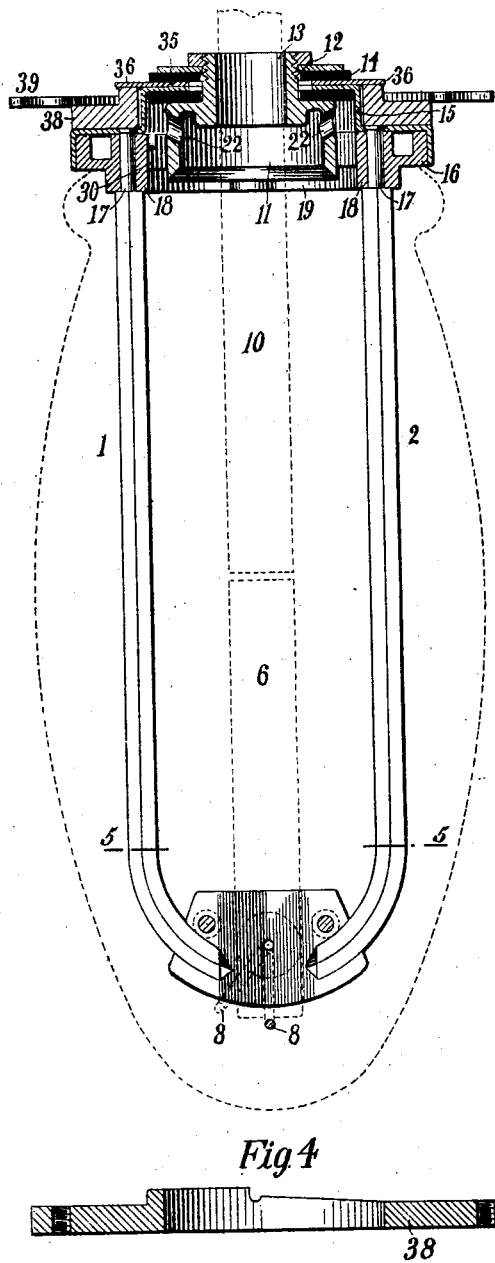
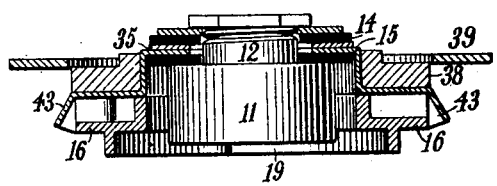
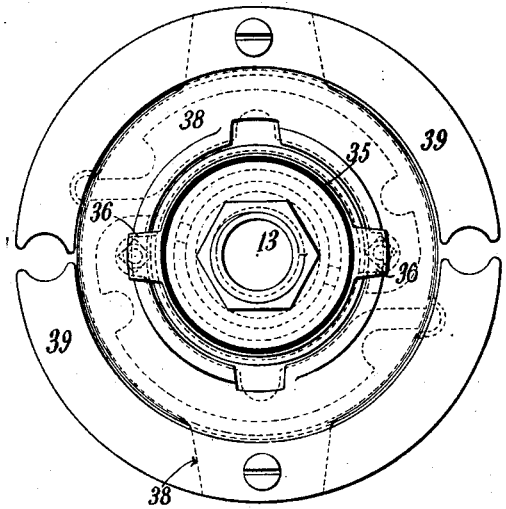
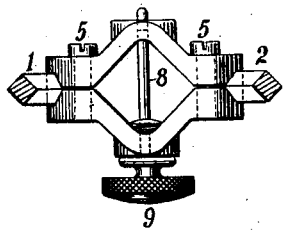
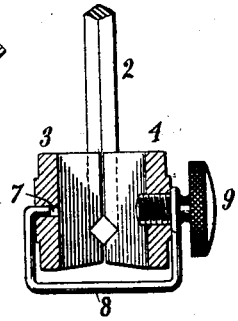
Witnesses:
Raphaël Netter
W. H. Capel
Philip Luhr, Inventor
by George H. Stockbridge Atty
THE NORRIS PETERS CO., PHOTO-LITHO., WASHINGTON, D. C.

No. 678,344. Patented July 9, 1901.
P. LUHR.
METHOD OF OPERATING ELECTRIC ARC LAMPS.
(Application filed Dec. 26, 1900.)
(No Model.) 4 Sheets—Sheet 2.

Witnesses:
Raphaël Netter
Wm. H. Capel.

Philip Luhr, Inventor
by George H. Stockbridge Atty

No. 678,344. Patented July 9, 1901.
P. LUHR.
METHOD OF OPERATING ELECTRIC ARC LAMPS.
(Application filed Dec. 26, 1900.)
(No Model.) 4 Sheets—Sheet 4.

Witnesses:
Raphaël Netter
W. H. Capel.

Philip Luhr, Inventor
by George H. Stockbridge Atty

UNITED STATES PATENT OFFICE.

PHILIP LUHR, OF ORANGE, NEW JERSEY, ASSIGNOR TO THE MANHATTAN GENERAL CONSTRUCTION COMPANY, OF NEW YORK.

METHOD OF OPERATING ELECTRIC-ARC LAMPS.

SPECIFICATION forming part of Letters Patent No. 678,344, dated July 9, 1901.

Application filed December 26, 1900. Serial No. 41,015. (No model.)

To all whom it may concern:

Be it known that I, PHILIP LUHR, a citizen of the United States, and a resident of Orange, in the county of Essex and State of New Jersey, have invented certain new and useful Improvements in Methods of Operating Electric-Arc Lamps, of which the following is a specification.

The present invention relates to an improved mode or method of operation for inclosed-arc lamps, whereby the oxygen introduced through the gas-check in the normal operation of such a lamp is caused to be heated in the upper portion of the lamp-bulb, and thus subjected to local circulation in that portion of the bulb without the creation of a specific downward tendency toward the point of combustion at the arc. By employing the described method the impurities generated in the process of combustion are taken care of, while at the same time an excessive supply of oxygen to the arc and a consequent wasting of the carbons is prevented.

The method of operation set forth in the present specification is embodied in certain lamps which are described and shown in my application for Letters Patent of the United States, Serial No. 26,936, filed August 15, 1900, and also in my application, Serial No. 30,105, filed September 15, 1900.

In order that the method may be fully understood, I have illustrated it in the accompanying drawings, in which—

Figure 7:
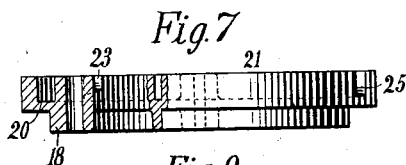
Figure 8:
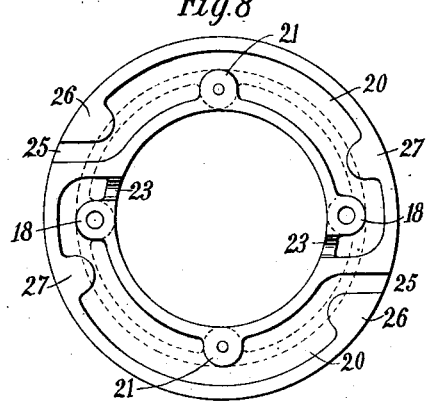
Figure 9:
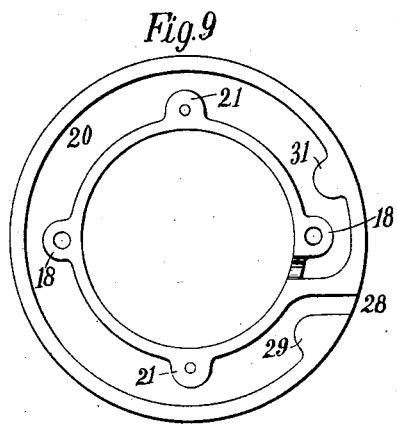
Figure 10:
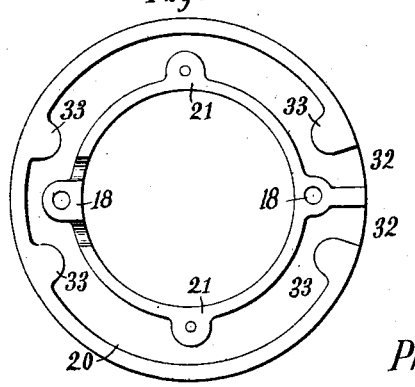
Figure 11:
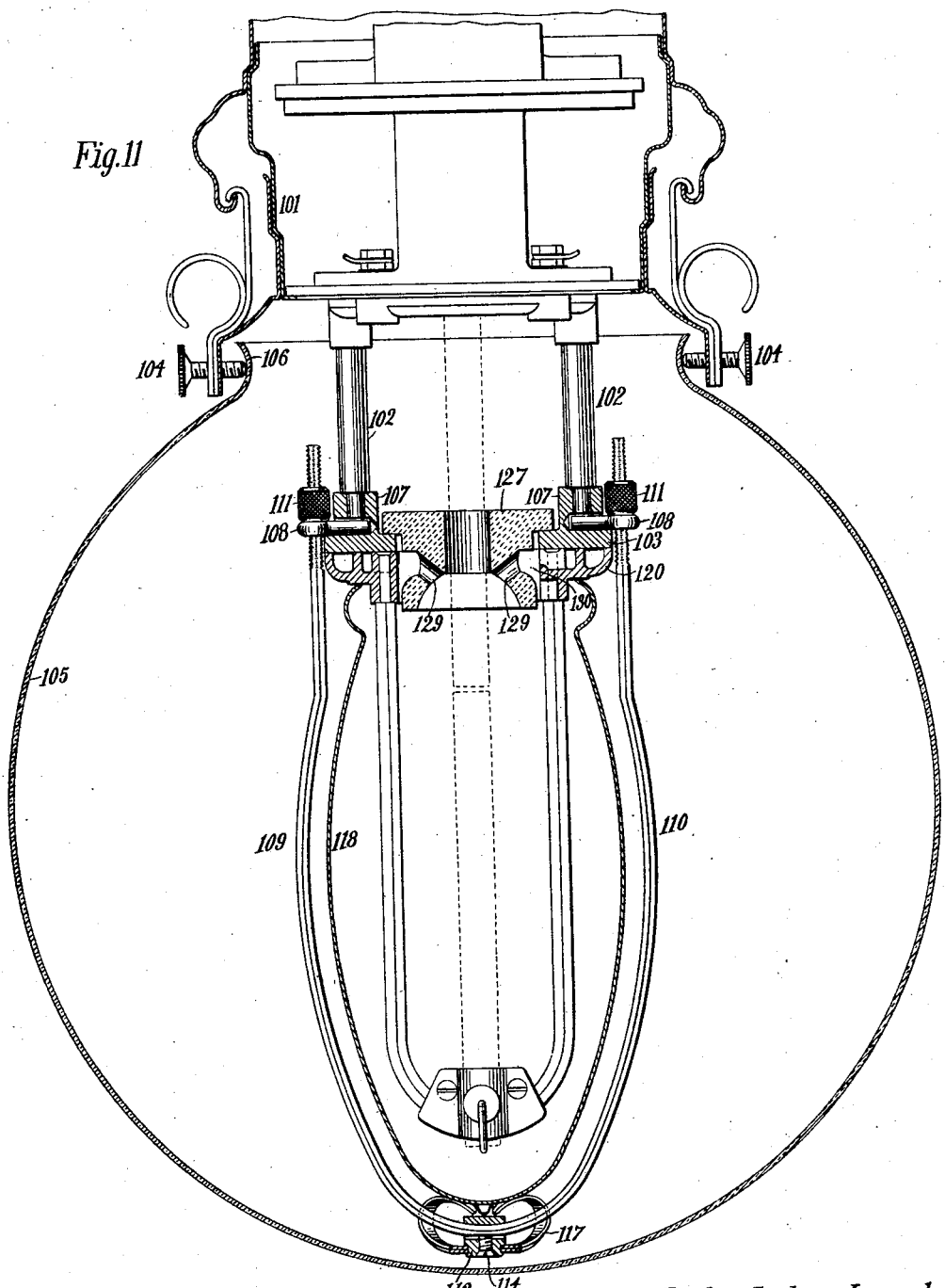
Figure 12:
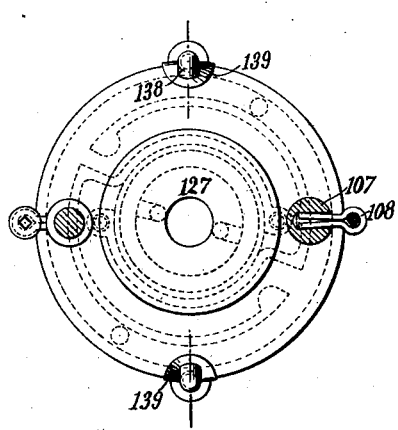
Figure 13:
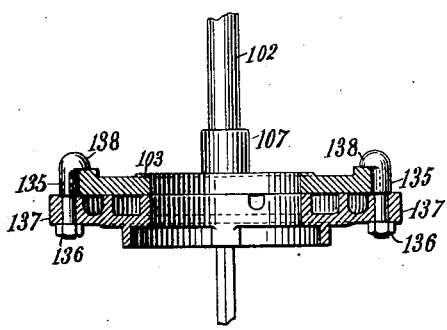
Figure 18:
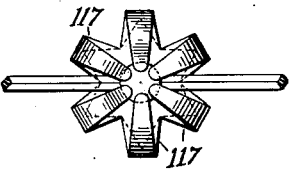

Figure 1 is an elevation of an inclosed-arc lamp embodying my invention, the upper portion thereof, including the gas-check, being shown in section and the carbons being shown in dotted lines. Fig. 2 is a vertical section through the upper part of the lower lamp structure, showing in full lines a central chamber which assists in causing the local circulation. Fig. 3 is a plan of the lower lamp structure. Fig. 4 is a vertical section through the central portion of a support for the gas-check and its connected parts. Fig. 5 is a plan of a holder for the lower carbon, showing the side rods in section along the line 5 5 in Fig. 1. Fig. 6 is a vertical section through the lower-carbon holder. Fig. 7 is a vertical section through one form of the gas-check, showing the air and gas passages therethrough. Fig. 8 is a plan of one form of my gas-check. Figs. 9 and 10 are similar views of modified forms of gas-check. Fig. 11 is a side elevation of an inclosed-arc lamp containing a different embodiment of my invention. Fig. 12 is a section along the line 12 12 in Fig. 11, looking downward. Fig. 13 is a section along the line 13 13 in Fig. 12. Figs. 14, 15, 16, and 17 are plan views of various forms of gas-check intended for use in connection with the inclosed-arc lamp illustrated in Fig. 11; and Fig. 18 is a plan of the elastic support for the glass bulb, the side rods being shown in section along the line 18 18 in Fig. 11.

Referring to the drawings in detail, and particularly at present to the first ten figures, 1 and 2 are the side rods of an inclosed-arc lamp, the same being designed, in the form illustrated, to be located within the bulb which incloses the arc. These side rods are curved toward each other at the bottom, and on opposite sides of their lower ends are secured bent plates or clamps 3 and 4 by means of screws 5 5. The plates 3 and 4 are bent away from each other at the center far enough to receive the lower carbon 6. The plate 3 is provided with an opening 7 to receive one end of a stirrup 8, the other end of which is pivotally secured to the shaft of a thumb-screw 9, which enters the plate 4. The stirrup 8 may be merely a wire, one end of which is bent around the shaft of the screw 9, the structure being such that when the thumb-screw is made tight by turning to the right in the usual way it will hold the stirrup in any position to which it may have been turned. On relieving the pressure of the screw 9 the stirrup may be adjusted to any desired position and afterward firmly held in place by turning the screw again to the right.

In practice in order to insert the lower carbon in place the thumb-screw 9 will be loosened, the stirrup 8 will be turned aside, as indicated in dotted lines in Fig. 1, and the carbon inserted from below. Afterward the stirrup will be turned down into its lowermost position, as shown in full lines in Fig. 1, and the thumb-screw tightened. In this way the lower carbon will easily be held in place. If the thumb-screw be turned far enough, it will serve the double purpose of holding the stirrup, as described, and of maintaining the lower carbon firmly in position.

Referring now to the upper part of the lamp structure, it will be seen that the upper carbon 10 passes through a cylindrical chamber 11, the hub 12 of which is provided with an opening 13, through which the upper carbon passes, the construction being such that very little gas can escape at the feed-opening between the outer surface of the carbon 10 and the inner wall of the opening 13. The chamber 11 is made in one piece with the hub 12 or is secured thereto by any suitable means, as by a screw connection, and it is wide enough to constitute a moderately large receptacle for the heated gases rising from the arc. The inner edge of the chamber 11 is beveled or chamfered, as shown, so as to present a rather sharp edge along its lower outer wall, the object of which construction is to assist in breaking up any possible arcing across from the upper carbon to the side rods.

The chamber 11, together with its hub 12, is insulated from the rest of the upper lamp structure, as shown at 14 14. Above the chamber 11, but insulated therefrom, is a cap 15, which extends downward and outward and is formed at its edge or rim into a flange, within which is placed the gas-check proper, (shown at 16.) At two opposite points in the edge or rim of the cap 15 I form ears 43 43, which are so placed as to dam off the outlet-passages in the gas-check and divert the path of the ingoing air toward the highly-heated currents circulating in the upper part of the lamp-bulb. The mode in which this action is accomplished will be better understood after the details of the gas-check proper shall have been described.

The ears 43 43, besides having the functions set forth above, also serve to form a hold for twisting the gas-check and the parts connected therewith from a locked position when no side rods are used.

The whole structure is secured to the top of the side rods 1 and 2 by means of screws or rivets 17 17, which pass from the rods through both the gas-check 16 and the cap 15. To aid in securing a firm connection between the parts last described, lugs 18 18, extending inside the main body of the lower rim 19 of the gas-check, are provided. These lugs are also extended upward, so as to obstruct to some extent a duct or channel 20 between the upper side of the gas-check and the lower side of the cap.

By referring to Figs. 8, 9, and 10 it will be seen that other lugs 21, 21, 26, 27, 29, 31, and 33 are located in the channel 20 to retard the normal outflow of the gases or to regulate the ingress and egress thereof.

Between the chamber 11 and the inner wall of the gas-check 16 is an annular chamber 30 of considerable capacity. I provide openings 22 22 through the wall of the chamber 11, so that any gases which may collect inside the said chamber may pass out into the annular chamber and produce a preliminary circirculation at that point. Moreover, I provide openings 23 23 at the inner ends of the channels 20, in proximity to the openings 22 22 and also in proximity to the points of connection between the gas-check and the posts 1 and 2.

By virtue of the described construction and arrangement a local circulation of the gases of combustion and of the incoming air is produced in the upper part of the lamp-bulb and in the annular chamber 30, and this circulation is augmented by the heat developed in the rods 1 and 2 in the normal operation of the lamp. The action appears to be due at least in part to the local heating of the atmospheric oxygen immediately on its entrance into the area which contains the burning carbons, such heating of the oxygen, taken in connection with the greater specific gravity of the gases of combustion, being sufficient to prevent the ready descent of the oxygen to the point where the carbons are burning. In this way the circulation inside the lamp-bulb and the areas connected therewith while sufficiently active to destroy and carry off impurities is mainly local in or near the upper part of the lamp-bulb, all excessive feeding of oxygen to the arc being avoided.

Figs. 8, 9, and 10 represent gas-checks which differ from each other in details, as shown. The gas-check illustrated in Fig. 8 is provided with openings 25 25, leading from the outer air into the channels 20 20. The incoming air passes first around the lugs 26 26 at the mouth of the channels and is afterward obstructed, as shown, by the lugs 21 21 and by the lugs 27 27. In the gas-check illustrated in Fig. 9 the air entering at 28 passes around a lug 29 and through a channel 20, obstructed by the lugs 21 21 and also by the lug 31 and the lugs 18 18. In the gas-check illustrated in Fig. 10 the air enters a suitable channel 20 at openings 32 32 and passes in opposite directions, being obstructed by the lugs 18 18, as before, and also by the lugs 33 33.

The side rods for the carbons may stand inside the usual glass inclosing globe or bulb, as shown in the drawings, or outside the same.

Above the cap 15 is a spring-washer 35, having projecting lugs 36 36, by means of which the lower lamp structure may be joined to the lower or trim plate of the upper lamp-frame. Such a trim-plate is represented at 37, and it consists, essentially, of a central portion 38, of cast-iron, and two semicircular springs 39 39, of sheet metal, which form part of the upper lamp-frame. The described structure produces a considerable massing of metal at this portion of the lamp and a concentration of the heat at the top casting, whereby the escape of heat is lessened and incoming currents of air are brought to a higher temperature.

The lugs 36 36 enter openings 40 40 in the central part or piece 38 and may be turned so as to ride up on semicircular flanges 41 41 at the interior of the central opening in the trim-plate. A stop 42 limits the rotary movement of the lugs.

The principle of operation of the lamp illustrated in Figs. 11 to 18, inclusive, is in general the same as that of the lamp already described. In the modified form of lamp 101 is a portion of the frame of the lamp, and 102 102 are posts depending from the frame and supporting a plate 103, which constitutes the lowermost plate or "trim-plate" of what may be termed the "upper" lamp-frame. To the frame 101 screws 104 104 are applied for supporting the outer lamp-globe 105, the globe being supplied for this purpose with a projecting flange or rim 106. The plate 103 is secured to the posts 102 102 by suitable sockets 107 107, which sockets are perforated, as shown in Figs. 11 and 12, to receive spring-cotters 108 108, having eyes which surround the side rods 109 and 110 of the lamp. The side rods are adjustably held above the spring-cotters by nuts 111 111. The rods 109 and 110 will generally be formed of one continuous piece of angular metal. To the lower part of the side rods I secure a button 112, to which is attached by any suitable means, as by a set-screw 114, a crown-support 117, having a number of bent-over arms upon which the lower part of the lamp-bulb 118 rests.

The supporting means for the lower carbon may be the same as those already described.

In the present instance the block constituting the chamber is a block 127 of porcelain or lava or some other good heat-resisting material. The chamber proper is formed in the lower end of this block, and from it passages 129 129 lead to an annular chamber 130 between the block 127 and the inner wall of the gas-check 120. The action is the same as has already been set forth in connection with the similar construction in the lamp illustrated in Figs. 1 to 10, inclusive. The non-conducting central block 127 furnishes good protection against arcing when the carbons are burning in the upper part of the inclosing bulb.

Figure 14:
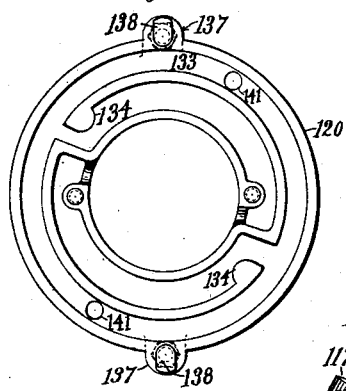
Figure 15:
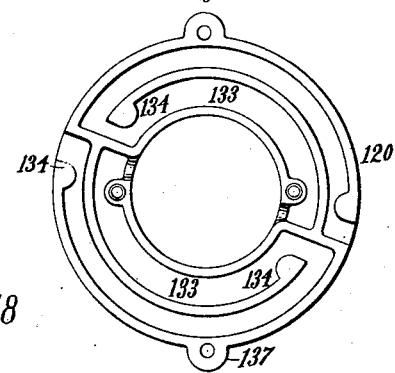
Figure 16:
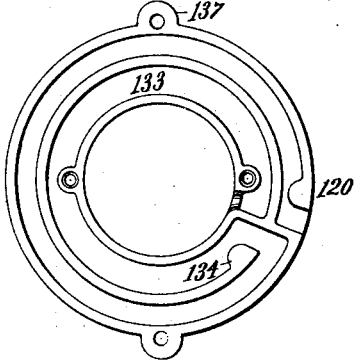
Figure 17:
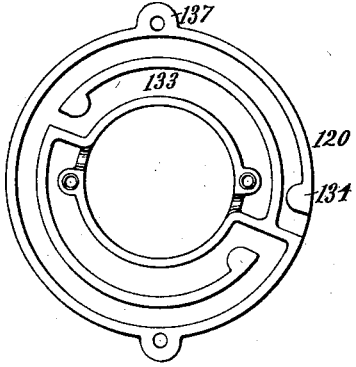

The special structure of the gas-check is illustrated in Figs. 13, 14, 15, 16, and 17. Fig. 14 shows exits for the gases on opposite sides, channels 133 133 for the gases, lugs 134 134 for obstructing the flow, and ports 141 141 in the bottom of the gas-check. Fig. 15 illustrates a construction in which the gases circulate in reverse directions through the opposite halves of the check, the channels through which they pass being shown at 133 133. In these channels lugs 134 134 are interposed for preventing too-rapid circulation. In Fig. 16 the air and the gases pass through two channels 133 133, which are almost completely circular, there being but one entrance and one exit passage for the air and the gases. Lugs 134 134 are present, as before, for preventing a too-free circulation. In Fig. 17 the gases from one port pass through only one half of the gas-check in order to reach the final exit, and from the other ports they pass in one direction through the opposite half of the gas-check and in the other direction through nearly all of both halves thereof.

It will be observed that the gas-checks last described are of larger size than the diameter of the bulb which incloses the arc, the object being to secure a higher concentration of heat at the center of the lamp structure by reason of the fact that the projecting outer portions of the gas-checks are affected by the currents of heated air between the outer lamp-globe and the inner bulb.

Convenient means for clamping the gas-check to the lower plate of the lamp are illustrated in Figs. 12 and 13, the same consisting of pins 135, held by nuts 136 in lugs or extensions 137 on the gas-check. These pins are provided with flanges or catches 138, adapted to ride and bind upon beveled segments 139 on the lower plate 103.

The invention claimed is—

1. The hereinbefore-described method of operating inclosed-arc lamps, which consists in creating in the upper portion of the inclosed area a local circulation of air and gases, whereby a too-rapid descent of the atmospheric oxygen to the point of combustion is prevented.

2. The hereinbefore-described method of operating an inclosed-arc lamp, which consists in locally heating the incoming air in the presence of the gases of combustion at a point in the inclosed area which is above the arc and thereby causing a local circulation of the air and gases and preventing the too-rapid descent of the oxygen to the burning arc.

3. The hereinbefore-described method of operating an inclosed-arc lamp, which consists in confining the gases of combustion around and below the arc, creating a local circulation of the air and gases above the arc within the inclosed area, and utilizing the greater specific gravity of the inert gases of combustion for preventing a too-rapid descent of the gases from the top of the inclosed area.

4. The hereinbefore-described method of operating an inclosed-arc lamp, which consists in confining the inert gases of combustion around and below the arc, locally heating the air and gases at the top of and within the inclosed area, and utilizing the greater specific gravity of the inert gases for preventing a too-rapid descent of the gases from above the arc.

Signed at New York, in the county of New York and State of New York, this 11th day of December, A. D. 1900.

PHILIP LUHR.

Witnesses:
WM. H. CAPEL,
J. H. JONES.